US012638129B2

(12) United States Patent
Hao

(10) Patent No.: US 12,638,129 B2
(45) Date of Patent: May 26, 2026

(54) EXPANDED SCREEN

(71) Applicant: OBDSPACE TECHNOLOGY CO, .LTD, Shenzhen (CN)

(72) Inventor: Xiaofeng Hao, Shenzhen (CN)

(73) Assignee: OBDSPACE TECHNOLOGY CO,. LTD, Shenzhen (CN)

( * ) Notice: Subject to any disclaimer, the term of this patent is extended or adjusted under 35 U.S.C. 154(b) by 291 days.

(21) Appl. No.: 18/361,755

(22) Filed: Jul. 28, 2023

(65) Prior Publication Data

US 2025/0036161 A1     Jan. 30, 2025

(51) Int. Cl.
*F16M 13/02*     (2006.01)
*F16M 11/38*     (2006.01)

(52) U.S. Cl.
CPC .......... *F16M 13/022* (2013.01); *F16M 11/38* (2013.01); *F16M 2200/025* (2013.01)

(58) Field of Classification Search
CPC .............................. F16M 13/022; F16M 11/38
USPC ....................................................... 248/316.1
See application file for complete search history.

(56) References Cited

U.S. PATENT DOCUMENTS

| | | | | |
|---|---|---|---|---|
| 8,752,802 | B1 * | 6/2014 | Fan .......................... | H04M 1/04 |
| | | | | 248/316.1 |
| 9,097,380 | B2 * | 8/2015 | Wheeler ............. | E05B 73/0017 |
| 11,363,895 | B2 * | 6/2022 | Schuft ................... | A47F 7/0246 |
| 11,463,564 | B2 * | 10/2022 | Zhang ................. | H04M 1/0266 |
| 11,739,568 | B2 * | 8/2023 | Penny ..................... | G06F 1/166 |
| | | | | 248/551 |
| 2021/0059437 | A1 * | 3/2021 | Chapuis ................. | F16M 11/04 |
| 2023/0028193 | A1 * | 1/2023 | Penny ................... | F16M 13/00 |
| 2024/0324119 | A1 * | 9/2024 | Ma ......................... | G06F 1/1607 |

* cited by examiner

*Primary Examiner* — Todd M Epps

(57)     ABSTRACT
The present disclosure provides an expanded screen. The expanded screen is detachably mounted on a display. The expanded screen includes an expanded screen main body, a first clamping member, a second clamping member and a connection component. One end of the first clamping member is provided with a first clamping portion. One end of the second clamping member is provided with a second clamping portion. The first clamping portion and the second clamping portion are clamped on the display. The other end of the first clamping member is slidably connected to the other end of the second clamping member through the connection component and the first clamping member and the second clamping member slide relative to each other, so that a distance between the first clamping member and the second clamping member is relatively extended or shortened.

15 Claims, 15 Drawing Sheets

1

A

101

102

3

103

41          1026          44

EXPANDED SCREEN

TECHNICAL FIELD

The present disclosure relates to an expanded screen, applied to the technical field of terminal devices.

BACKGROUND

In the prior art, terminals have been essential in people's lives. With the growth of people's needs, terminals with expanded screens have also come into being. In a production process of conventional terminal products such as a notebook computer and a desktop display, a size of a screen has been determined, but in practical applications, it is difficult to meet needs of customers for multiple screens or large screens. Therefore, in order to meet the needs of the consumers, a split-screen displaying technology is usually used to achieve a multi-screen displaying effect. At present, since an expanded screen of a commercially available portable multi-screen device is non-removable, the expanded screen also needs to be carried when it will not be used, causing inconvenience in carrying. Moreover, for most expanded screens, a clamping width cannot be adjusted according to a width of a display, resulting in that the expanded screens can only be used on a display with a certain width, so that the expanded screen is low in usage flexibility and is inconvenient to use. Some expanded screens are not provided with supporting frames. If these expanded screens are placed on a platform, instead of being clamped on a display, for use, they cannot stand. As a result, when placed on the platform, such an expanded screen can only be manually made to stand or lie on the platform, so it is inconvenient for a user to watch the expanded screen.

SUMMARY

For the problem of a portable multi-screen device in the prior art mentioned above that an expanded screen is non-removable and a clamping width cannot be adjusted, the present disclosure provides an expanded screen. An expanded screen main body is provided with a first clamping member, a second clamping member, and a connection component; and the first clamping member and the second clamping member are detachably clamped on a display, which is convenient for users to carry. By using the connection component, the first clamping member and the second clamping member slide relatively to adjust a clamping space, so that the expanded screen can be clamped on displays with different widths. The expanded screen can be clamped on different displays, so that the usage flexibility is high, and usage is facilitated.

The technical solution adopted by the present disclosure to solve the technical problem is as follows: an expanded screen, wherein the expanded screen is detachably mounted on a display; the expanded screen includes an expanded screen main body, a first clamping member, a second clamping member, and a connection component; the connection component, the first clamping member, and the second clamping member are all arranged on the expanded screen main body; one end of the first clamping member is provided with a first clamping portion; one end of the second clamping member is provided with a second clamping portion; the first clamping portion and the second clamping portion are clamped on the display; the other end of the first clamping member is slidably connected to the other end of the second clamping member through the connection component; and the first clamping member and the second clamping member slide relative to each other, so that a distance between the first clamping member and the second clamping member is relatively extended or shortened.

Further, the connection component includes a gear and a locking component; both the gear and the locking component are arranged on the expanded screen main body; the first clamping component includes a first connection end and a first clamping end; the first clamping portion is arranged at one end of the first clamping end, and the other end of the first connection end is fixedly connected to one end of the first clamping end; the second clamping member includes a second connection end and a second clamping end; the second clamping portion is arranged at one end of the second clamping end, and the other end of the second connection end is fixedly connected to one end of the second clamping end; the first connection end and the second connection end are both provided with sawteeth; the sawteeth are clamped with sawteeth of the gear; the first connection end slides relative to the second connection end through the connection component; a clamping space is formed between the first clamping portion and the second clamping portion; and the locking component is used for fixing the clamping space.

Further, the locking component includes an elastic member and a positioning column; the positioning column is fixedly connected to the expanded screen main body; one end of the elastic member is connected to the positioning column, and the other end of the elastic member is connected to the first clamping member or the second clamping member; when the first clamping member and the second clamping member slide away from each other; and the elastic member enables the first clamping member and the second clamping member to be inwards tightened.

Further, the gear includes a first gear and a second gear; the first connection end includes a first rack A and a first rack B; the second connection end includes a second rack A and a second rack B; the first rack A and the second rack A are both connected to the first gear; the sawteeth of the first rack A and the sawteeth of the second rack A are both clamped with the sawteeth of the first gear; the first rack A and the second rack A slide relative to the first gear; the first rack B and the second rack B are both connected to the second gear; the sawteeth of the first rack B and the sawteeth of the second rack B are both clamped with the sawteeth of the second gear; the first rack B and the second rack B slide relative to the second gear; and when the first clamping member slides away from the second clamping member, the first clamping member drives the second clamping member to slide through the first gear and the second gear.

Further, the first rack A is provided with a first clamping portion A; the first rack B is provided with a first clamping portion B; a first stop portion A and a first stop portion B are further arranged in the expanded screen main body; the first stop portion A and the first stop portion B are arranged between the first rack A and the first rack B; and when the first clamping member is stretched away from the expanded screen main body, the first stop portion A is clamped to the first clamping portion A, and the first stop portion B is clamped to the first clamping portion B, so as to maintain connection between the first rack A and the first gear and connection between the first rack B and the second gear.

Further, the first clamping member is further provided with a first clamping portion C and a first clamping portion D; and when the first clamping member is tightened towards the expanded screen main body, the first stop portion A is clamped to the first clamping portion C, and the first stop portion B is clamped to the first clamping portion D, so as to maintain connection between the first rack A and the first gear and connection between the first rack B and the second gear.

Further, a second clamping portion A is arranged on an outer side of the second rack A, and a second clamping portion B is arranged on an outer side of the second rack B; and when the second clamping member is stretched away from the expanded screen main body, an inner wall of the expanded screen main body is clamped to the second clamping portion A and the second clamping portion B to maintain connection between the second rack A and the first gear and the connection between the second rack B and the second gear.

Further, the second clamping member is further provided with a second clamping portion C and a second clamping portion D; a second stop portion A and a second stop portion B are further arranged in the expanded screen main body; the second stop portion A and the second stop portion B are arranged between the second rack A and the second rack B; and when the second clamping member is tightened towards the expanded screen main body, the second stop portion A is clamped to the second clamping portion C, and the second stop portion B is clamped to the second clamping portion D, so as to maintain connection between the first rack A and the first gear and connection between the first rack B and the second gear.

Further, a first guide rail A, a first guide rail B, a second guide rail A, and a second guide rail B are arranged in the expanded screen main body; the first guide rail A is arranged on a bottom of the first rack A; the first rack A is clamped to the first guide rail A; the first rack A slides along the first guide rail A; the first guide rail B is arranged on a bottom of the first rack B; the first rack B is clamped to the first guide rail B; the first rack B slides along the first guide rail B; the second guide rail A is arranged on a bottom of the second rack A; the second rack A is clamped to the second guide rail A; the second rack A slides along the second guide rail A; the second guide rail B is arranged on a bottom of the second rack B; the second rack B is clamped to the second guide rail B; and the second rack B slides along the second guide rail B.

Further, the expanded screen further includes a supporting frame; the supporting frame is arranged on a back surface of the expanded screen main body; the supporting frame is rotatably connected to the expanded screen main body; and when the expanded screen is placed on a platform, the supporting frame supports the expanded screen main body.

Further, the expanded screen main body includes a display device and a clamping device; the clamping device is rotatably connected to the display device; and the first clamping member, the second clamping member, the connection component, and the supporting frame are all arranged on the clamping device.

Further, the supporting frame includes a first supporting arm and a second supporting arm; the first supporting arm is arranged on a first side of the clamping device; the first side of the clamping device is fixedly provided with a first connection shaft; the first supporting arm is rotatably connected to the first connection shaft; the second supporting arm is arranged on a second side of the clamping device; a second connection shaft is fixedly arranged on the second side of the clamping device; the second supporting arm is rotatably connected to the second connection shaft; and the first side of the clamping device is opposite to the second side of the clamping device.

Further, the supporting frame further includes a first extension rod and a second extension rod; one end of the first extension rod is arranged in the first supporting arm, and the other end of the first extension rod extends out of the first supporting arm; the first extension rod is stretched and extends along the first supporting arm; one end of the second extension rod is arranged in the second supporting arm; the other end of the second extension rod extends out of the second supporting arm; and the second extension rod is stretched and extends along the second supporting arm.

Further, two or more first clamping slots are formed in the first supporting arm; the first clamping slots are arranged on two sides of the first extension rod; the first clamping slots are internally provided with first balls and wrap the first balls; diameters of the first balls are greater than diameters of notches of the first clamping slots, so that the first balls are maintained in the first clamping slots; one end of each first ball is butted with an inner wall of the notch of the corresponding first clamping slot, and the other end of the first ball is butted with a side wall of the first extension rod; two or more second clamping slots are formed in the second supporting arm; the second clamping slots are arranged on two sides of the second extension rod; the second clamping slots are internally provided with second balls and wrap the second balls; diameters of the second balls are greater than diameters of notches of the second clamping slots, so that the second balls are maintained in the second clamping slots; and one end of each second ball is butted with an inner wall of the notch of the corresponding second clamping slot, and the other end of the second ball is butted with a side wall of the second extension rod.

Further, the supporting frame further includes a third supporting arm; one end of the third supporting arm is fixedly connected to the first supporting arm, and the other end of the third supporting arm is fixedly connected to the second supporting arm; the supporting frame further includes a third extension rod and a sliding member connected to the third extension rod; the third extension rod is arranged in the third supporting arm; first openings are formed in both a third side surface and a fourth side surface of the third supporting arm; when the third extension rod is slid, one end of the third extension rod is threaded through the first opening; a second opening is formed in a first side surface of the third supporting arm; the sliding member extends out of the second opening; and the sliding member is used for controlling the sliding of the third extension rod.

Further, two or more third clamping slots are formed in the third supporting arm; the third clamping slots are arranged on two sides of the third extension rod; the third clamping slots are internally provided with third balls and wrap the third balls; diameters of the third balls are greater than diameters of notches of the third clamping slots, so that the third balls are maintained in the third clamping slots; and one end of each third ball is butted with an inner wall of the notch of the corresponding third clamping slot, and the other end of the third ball is butted with a side wall of the third extension rod.

Further, the expanded screen further includes one or more connection interfaces and a control circuit board; the connection interfaces are arranged on a fourth side of the clamping device; a fourth side surface of the third supporting arm covers the connection interfaces; the control circuit board is arranged in the clamping device; and both the connection interfaces and the display device are electrically connected to the control circuit board.

Further, the expanded screen further includes a third connection shaft, a fourth connection shaft, and a wire; the fourth connection shaft is provided with a through hole; a first connector is arranged on a third side of the clamping device; a wire passing channel is arranged in the first connector; the wire passing channel is communicated to an interior of the clamping device; a first connector is provided with a first mounting hole and a first threading hole on both sides; the first threading hole is communicated to the wire passing channel; a second connector is arranged at one end of the display device; a notch is formed in the middle of the second connector; the notch is provided with a second mounting hole and a second threading hole on both sides; the second threading hole is communicated to an interior of the second connector; the second connector is communicated to an interior of the display device; a connection end of the first connector is mounted at the notch; a gap exists between the connection end of the first connector and a first side wall of the second connector opposite the notch; one end of the third connection shaft is fixedly plugged into the first mounting hole, and the other end of the third connection shaft is movably plugged into the second mounting hole; one end of the fourth connection shaft is fixedly connected to the clamping device; the through hole of the fourth connection shaft is communicated to the first threading hole; the other end of the fourth connection shaft is movably plugged into the second threading hole, and the through hole of the fourth connection shaft is communicated to the second threading hole; and one end of the wire is connected to the control circuit board, and the other end of the wire is electrically connected to the display device through the wire passing channel, the first threading hole, the through hole, the second threading hole, and the second connector in sequence.

Further, a third stop portion is arranged on the first connector; when the display device is rotated towards a front surface of the clamping device, the third stop portion stops a front surface of the display device from abutting against the front surface of the clamping device; and when the display device is rotated towards a back surface of the clamping device, a back surface of the display device abuts against the back surface of the clamping device.

Further, the first connector includes a first connection surface, a second connection surface, a third connection surface, a fourth connection surface, and a fifth connection surface; the first connection surface, the second connection surface, and the fifth connection surface are connected end to end; the third connection surface, the fourth connection surface, and the fifth connection surface are arranged on two sides of the first connection surface and the second connection surface and are connected to the third connection surface, the fourth connection surface, and the fifth connection surface; the first connection surface and the fifth connection surface are connected to form an inner corner; the inner corner is an acute angle; the third stop portion is the second connection surface; the clamping device is fixedly connected to the first connection surface; the first threading hole is formed in the third connection surface and is close to the inner corner; the first mounting hole is formed in the fourth connection surface and is close to the inner corner; when the display device is rotated towards the front surface of the clamping device, a first side edge of the display device is butted with the second connection surface, and the front surface of the display device forms an angle α with the front surface of the clamping device; and when the display device is rotated towards the back surface of the clamping device, the back surface of the display device abuts against the back surface of the clamping device.

Beneficial effects of the present disclosure: By using the connection component, the first clamping member and the second clamping member can slide relatively to adjust the clamping space, so that the expanded screen can be clamped to different displays. A supporting frame is arranged on the clamping device, so that the expanded screen can stand when placed on a platform instead of being clamped on a display, and it is convenient for users to watch the expanded screen.

DETAILED DESCRIPTION OF THE EMBODIMENTS

Figure 1:
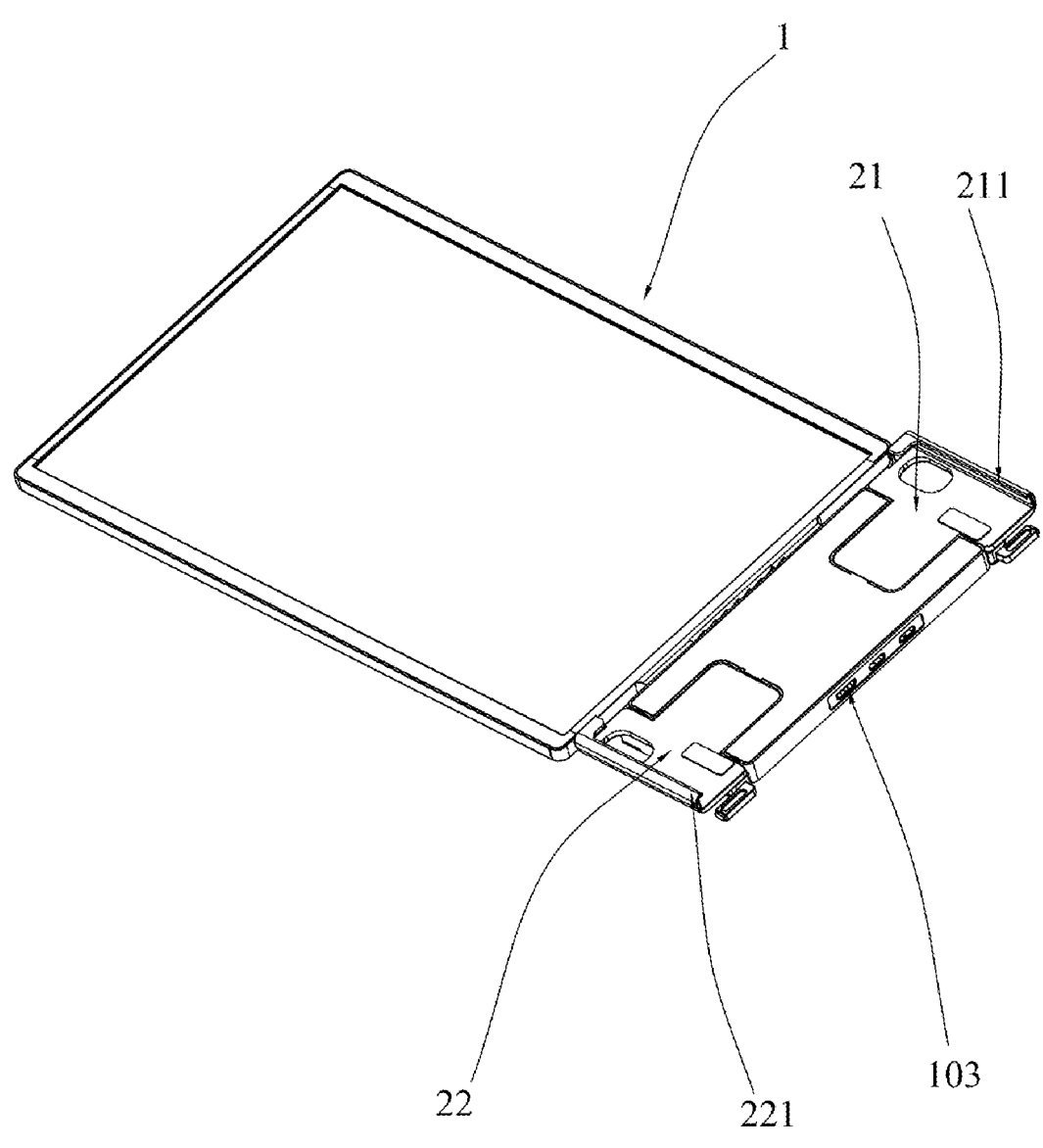
FIG. 1 is a three-dimensional diagram of an expanded screen according to the present disclosure.

In order to make the aims, technical solution and advantages of the present disclosure will be clearly, the present disclosure is further described below in combination with accompanying drawings and implementations. It should be understood that the specific embodiments described herein are intended only to explain the present disclosure and are not intended to define the present disclosure.

Referring to FIG. 1 to FIG. 20, the present disclosure provides an expanded screen. The expanded screen can be connected to a terminal with a display, such as a mobile phone, a notebook computer, a desktop computer, a tablet, an e-book, a handheld game console, a video player, and the like. The expanded screen can transmit information to the display in a plugged, wired and/or wireless manner. The structure of the expanded screen can be the structure of an existing display screen, and will not be limited here. The expanded screen is detachably mounted on the display. In this embodiment, the display is explained by taking a display of a desktop computer as an example.

In this embodiment, as shown in FIG. 1 to FIG. 6, the expanded screen mainly includes an expanded screen main body 1, a first clamping member 21, a second clamping member 22, and a connection component 23. The connection component 23, the first clamping member 21, and the second clamping member 22 are all arranged on the expanded screen main body 1. One end of the first clamping member 21 is provided with a first clamping portion 211. One end of the second clamping member 22 is provided with a second clamping portion 221; the first clamping portion 211 and the second clamping portion 221 are clamped on a display; the other end of the first clamping member 21 is slidably connected to the other end of the second clamping member 22 through the connection component 23; and the first clamping member 21 and the second clamping member 22 slide relative to each other, so that a distance between the first clamping member 211 and the second clamping member 221 is relatively extended or shortened. The first clamping portion and the second clamping portion are detachably clamped on the display, which is convenient for a user to carry. By using the connection component, the first clamping member and the second clamping member can slide relatively, so that the distance between the first clamping portion 211 and the second clamping portion 221 can be extended or shortened relatively to adjust the clamping space, and the expanded screen can be clamped on displays with different widths. The expanded screen can be clamped on different displays. Compared with the prior art, the clamping space can be adjusted, so that the expanded screen is high in usage flexibility and is convenient to use, and the use experience of the user is improved.

Figure 3:
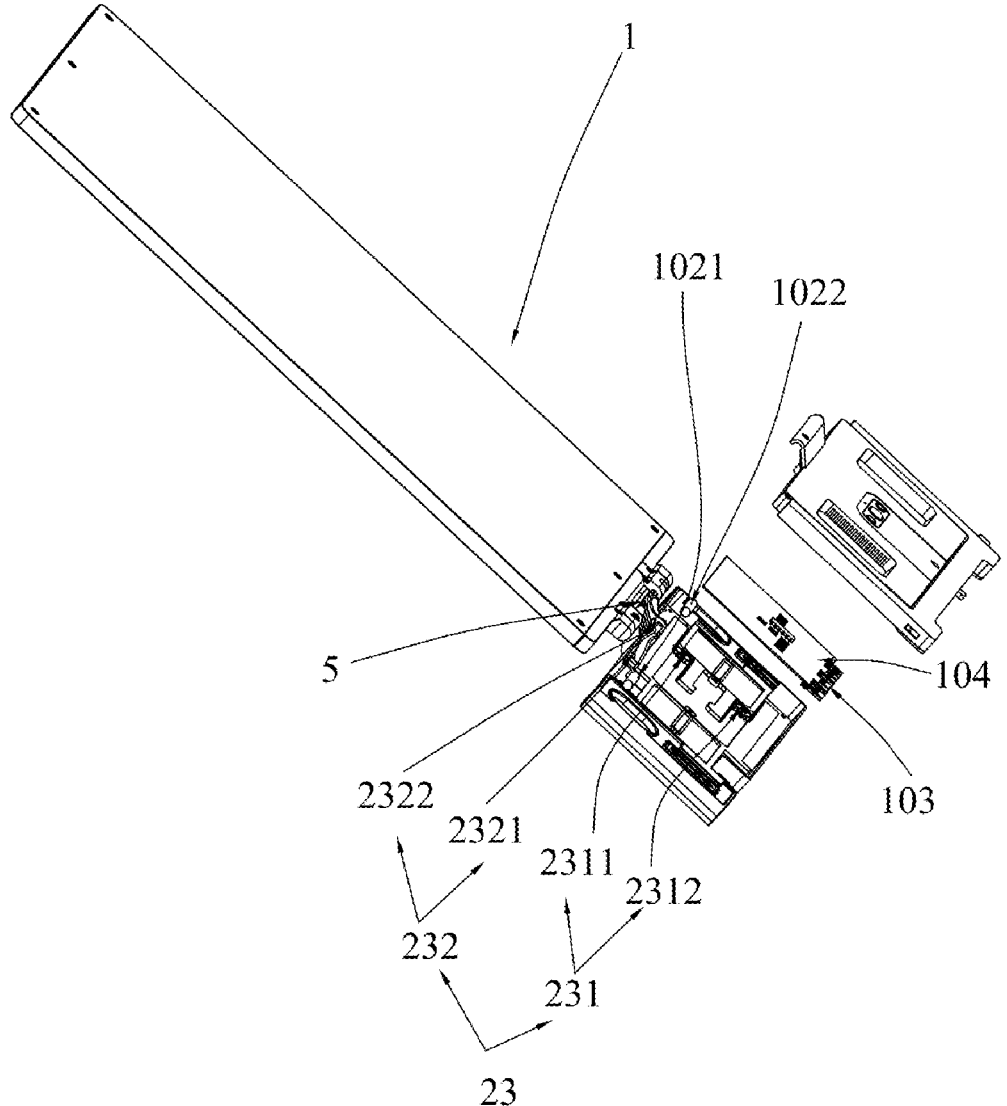
FIG. 3 is a schematic exploded diagram of an expanded screen according to the present disclosure.
Figure 4:
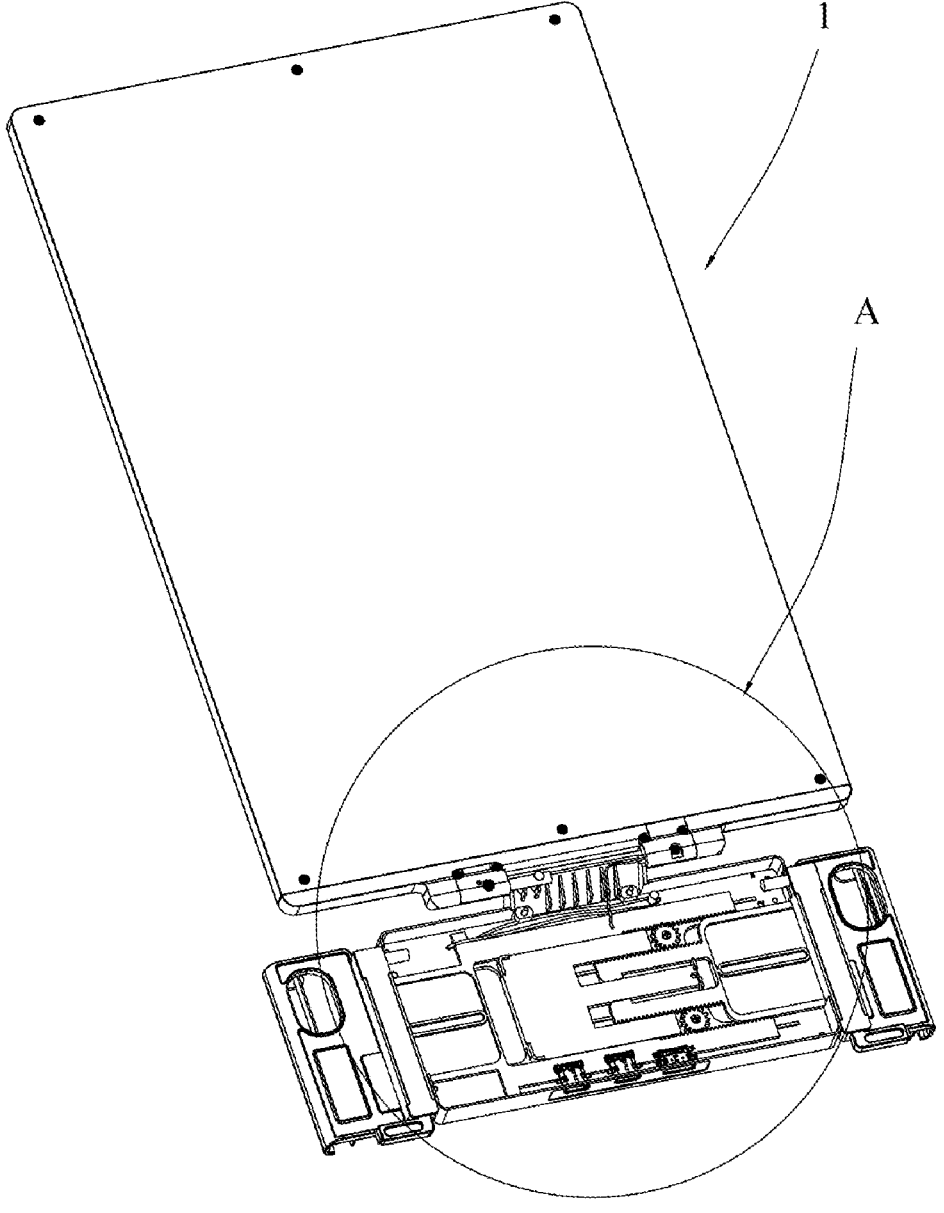
FIG. 4 is a schematic diagram of a layout of an internal structure of an expanded screen according to the present disclosure.

In this embodiment, as shown in FIG. 3, the connection component 23 includes a gear 231 and a locking component 232. Both the gear 231 and the locking component 232 are arranged on the expanded screen main body 1. The first clamping component 21 includes a first connection end 212 and a first clamping end 213. The first clamping portion 211 is arranged at one end of the first clamping end 213, and the other end of the first connection end 212 is fixedly connected to one end of the first clamping end 213. The second clamping member 22 includes a second connection end 222 and a second clamping end 223; the second clamping portion 221 is arranged at one end of the second clamping end 223, and the other end of the second connection end 222 is fixedly connected to one end of the second clamping end 223; the first connection end 212 and the second connection end 222 are both provided with sawteeth 202; the sawteeth 202 are clamped with sawteeth of the gear 231; the first connection end 212 slides relative to the second connection end 222 through the connection component 23; a clamping space is formed between the first clamping portion 211 and the second clamping portion 221; and the locking component 232 is used for fixing the clamping space. In this embodiment, due to the use of gear drive, the first clamping member can be stretched or tightened to drive the second clamping member, or the second clamping member is stretched or tightened to drive the first clamping member. The gear drive design is simple, with few parts and accurate and efficient drive. The expanded screen has compact structure, reliable work, and long life. The locking component is mainly used for fixing the clamping space to prevent the first clamping member and the second clamping member from being unstably clamped on the display. The locking component can be of a locking structure. The locking structure locks the gear to make the gear unable to rotate. If the user intends to fix the clamping space after stretching the first clamping member and the second clamping member, the locking structure locks the gear to make the gear unable to rotate, or the elastic member is used. When the first clamping member and the second clamping member are stretched away from each other, the elastic member enables the first clamping member and the second clamping member to have a reset force, so that the first clamping member and the second clamping member get close to each other to be tightened. In this way, it is more favorable for clamping the expanded screen on the display more stably.

Figure 5:
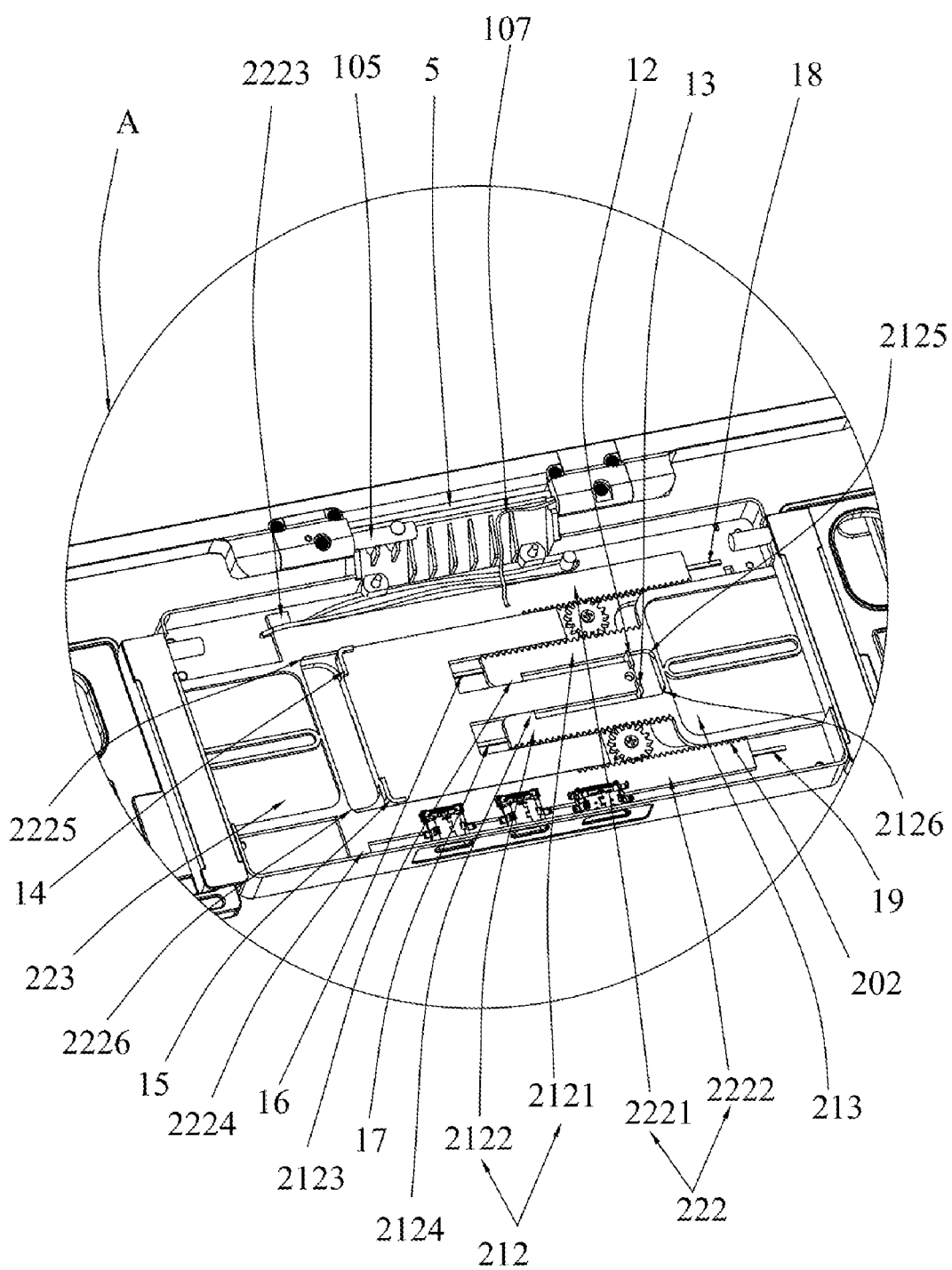
FIG. 5 is an enlarged diagram of A according to the present disclosure.

In this embodiment, as shown in FIG. 5, preferably, the locking component 232 includes an elastic member 2321 and a positioning column 2322; the positioning column 2322 is fixedly connected to the expanded screen main body 1; one end of the elastic member 2321 is connected to the positioning column 11, and the other end of the elastic member 2321 is connected to the first clamping member 21 or the second clamping member 22; when the first clamping member 21 and the second clamping member 22 slide away from each other, the elastic member 2321 enables the first clamping member 21 and the second clamping member 22 to be inwards tightened inwards. The elastic member can use an elastic member such as a spring, a belt, or a rubber band. The rubber band is preferred here because the rubber band has high elastic force and high reset force and is more convenient to mount. However, it should be noted that the rubber band is also easily stretched to break because of its high elasticity. The rubber band is arranged as many as possible to increase the reset force and prevent inability of use because of breakage.

In this embodiment, as shown in FIG. 5, the gear 231 includes a first gear 2311 and a second gear 2312; the first connection end 212 includes a first rack A 2121 and a first rack B 2122; the second connection end 222 includes a second rack A 2221 and a second rack B 2222; the first rack A 2121 and the second rack A 2221 are both connected to the first gear 2311; the sawteeth of the first rack A 2121 and the sawteeth of the second rack A 2221 are both clamped with the sawteeth of the first gear 2311; the first rack A 2121 and the second rack A 2221 slide relative to the first gear 2311; the first rack B 2122 and the second rack B 2222 are both connected to the second gear 2312; the sawteeth of the first rack B 2122 and the sawteeth of the second rack B 2222 are both clamped with the sawteeth of the second gear 2312; the first rack B 2122 and the second rack B 2222 can slide relative to the second gear 2312; and when the first clamping member 21 slides away from the second clamping member 22, the first clamping member 21 drives the second clamping member 22 to slide through the first gear 2311 and the second gear 2312. Due to the cooperation between the gears and the racks, the expanded screen works steadily and has high reliability. Gear and rack drive has high transmission power and achieves long life. The gear drive is used to transmit motion and power between any two shafts. A circumferential velocity can reach 300 m/s, and the transmitted power can reach 105 KW.

In this embodiment, as shown in FIG. 5, the first rack A 2121 is provided with a first clamping portion A 2123; the first rack B 2122 is provided with a first clamping portion B 2124; a first stop portion A 12 and a first stop portion B 13 are further arranged in the expanded screen main body 1; the first stop portion A 12 and the first stop portion B 13 are arranged between the first rack A 2121 and the first rack B 2122; and when the first clamping member 21 is stretched away from the expanded screen main body 1, the first stop portion A 12 is clamped to the first clamping portion A 2123, and the first stop portion B 13 is clamped to the first clamping portion B 2124, so as to maintain connection between the first rack A 2121 and the first gear 2311 and connection between the first rack B 2122 and the second gear 2312. The first rack A 2121 is prevented from falling off from the first gear, and the first rack B 2122 is prevented from falling off from the second gear.

In this embodiment, as shown in FIG. 5, the first clamping member 21 is further provided with a first clamping portion C 2125 and a first clamping portion D 2126; and when the first clamping member 21 is tightened towards the expanded screen main body 1, the first stop portion A 12 is clamped to the first clamping portion C 2125, and the first stop portion B 13 is clamped to the first clamping portion D 2126, so as to maintain connection between the first rack A 2121 and the first gear 2311 and connection between the first rack 2122 B and the second gear 2312. The first rack A 2121 is prevented from falling off from the first gear, and the first rack B 2122 is prevented from falling off from the second gear.

In this embodiment, a second clamping portion A 2223 is arranged on an outer side of the second rack A 2221, and a second clamping portion B 2224 is arranged on an outer side of the second rack B 2222; and when the second clamping member 22 is stretched away from the expanded screen main body 1, an inner wall of the expanded screen main body 1 is clamped to the second clamping portion A 2223 and the second clamping portion B 2224 to maintain connection between the second rack A 2221 and the first gear 2311 and connection between the second rack B 2222 and the second gear 2312. The second rack A 2221 is prevented from falling off from the first gear, and the second rack B 2222 is prevented from falling off from the second gear.

In this embodiment, as shown in FIG. 5, the second clamping member 22 is further provided with a second clamping portion C 2225 and a second clamping portion D 2226; a second stop portion A 14 and a second stop portion B 15 are further arranged in the expanded screen main body 1; the second stop portion A 14 and the second stop portion B 15 are arranged between the second rack A 2221 and the second rack B 2222; and when the second clamping member 22 is tightened towards the expanded screen main body 1, the second stop portion A 14 is clamped to the second clamping portion C 2225, and the second stop portion B 15 is clamped to the second clamping portion D 2226, so as to maintain connection between the first rack A 2221 and the first gear 2311 and connection between the first rack B 2222 and the second gear 2312. The second rack A 2221 is prevented from falling off from the first gear, and the second rack B 2222 is prevented from falling off from the second gear.

In this embodiment, as shown in FIG. 5, a first guide rail A 16, a first guide rail B 17, a second guide rail A 18, and a second guide rail B 19 are arranged in the expanded screen main body 1; the first guide rail A 16 is arranged on a bottom of the first rack A 2121; the first rack A 2121 is clamped to the first guide rail A 16; the first rack A 2121 slides along the first guide rail A 16; the first guide rail B 17 is arranged on a bottom of the first rack B 2122; the first rack B 2122 is clamped to the first guide rail B 17; the first rack B 2122 slides along the first guide rail B 17; the second guide rail A 18 is arranged on a bottom of the second rack A 2221; the second rack A 2221 is clamped to the second guide rail A 18; the second rack A 2221 slides along the second guide rail A 18; the second guide rail B 19 is arranged on a bottom of the second rack B 2222; the second rack B 2222 is clamped to the second guide rail B 19; and the second rack B 2222 slides along the second guide rail B 19. By the arrangement of the guide rails, high-accuracy linear motion of the racks can be achieved. It is necessary to arrange a lubricant between the guide rails and the racks to reduce wear of the guide rails, prevent corrosion of the guide rails, and reduce vibrations, so that the first clamping member and the second clamping member are stretched more smoothly. The guide rails have a simple design, which facilitates demolding. Furthermore, the linear motion has high accuracy, so the use experience of the user is improved.

In this embodiment, the expanded screen further includes a supporting frame 3; the supporting frame 3 is arranged on a back surface of the expanded screen main body 1; the supporting frame 3 is rotatably connected to the expanded screen main body 1; and when the expanded screen is placed on a platform, the supporting frame 3 can support the expanded screen main body 1, so that the expanded screen can stand. The existing expanded screen is provided with no independent supporting frame. If a user does not intend to clamp the expanded screen on a display during use, the user needs to find another support or holds the expanded screen with a hand.

Figure 6:
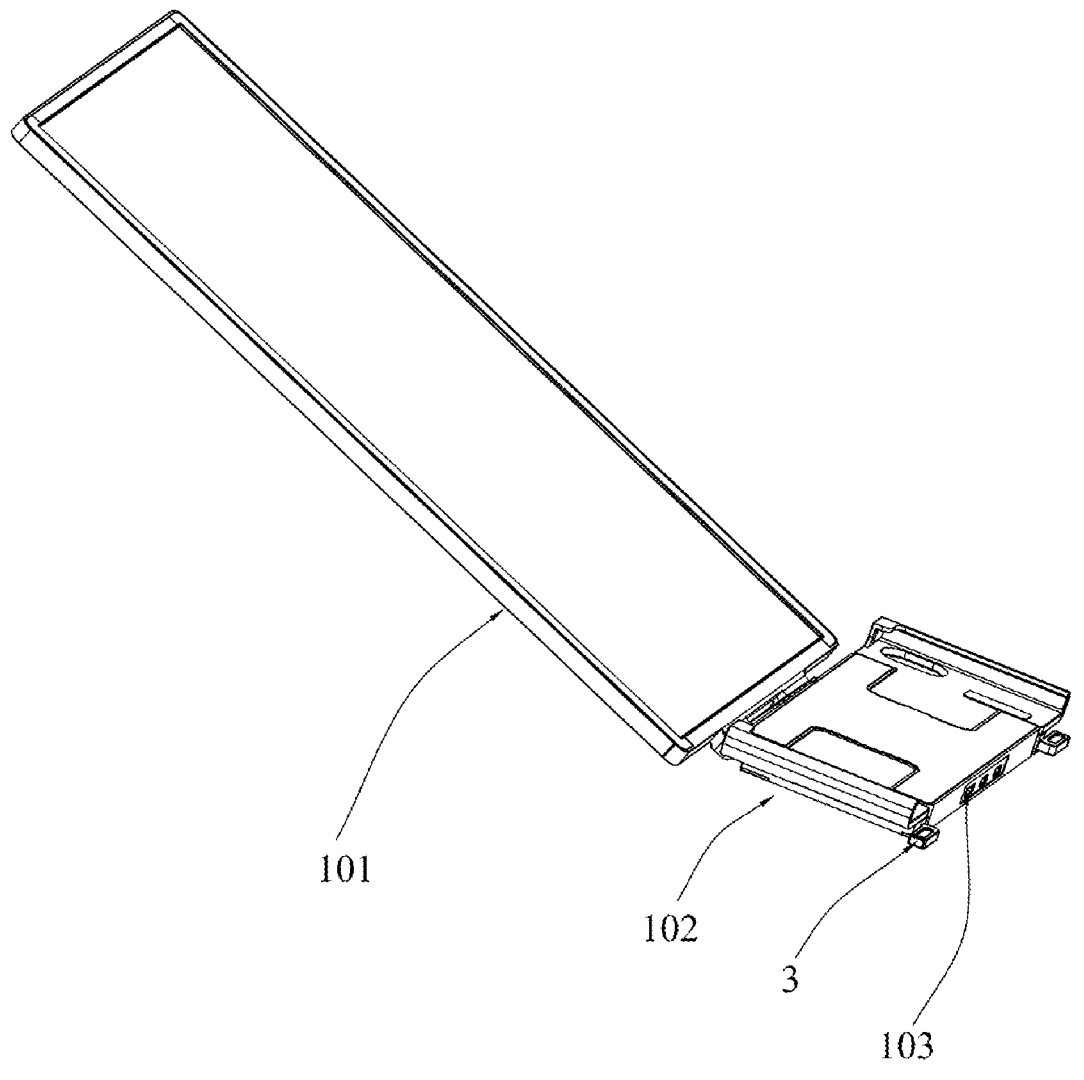
FIG. 6 is a schematic diagram of rotation of a display device and a clamping device according to the present disclosure.

In this embodiment, as shown in FIG. 6, the expanded screen main body 1 includes a display device 101 and a clamping device 102; the clamping device 102 is rotatably connected to the display device 101; and the first clamping member 21, the second clamping member 22, the connection component 23, and the supporting frame 3 are all arranged on the clamping device 102. The display device 101 and the clamping device 102 are separately arranged. Electronic parts can be arranged in the clamping device, and the number of electronic elements arranged in the display device is reduced, so that the display device looks thinner and more beautiful, and is not heavy.

In this embodiment, the supporting frame 3 includes a first supporting arm 31 and a second supporting arm 32; the first supporting arm 31 is arranged on a first side of the clamping device 102; the first side of the clamping device 102 is fixedly provided with a first connection shaft 1021; the first supporting arm 31 is rotatably connected to the first connection shaft 1021; the second supporting arm 32 is arranged on a second side of the clamping device 102; a second connection shaft 1022 is fixedly arranged on the second side of the clamping device 102; the second supporting arm 32 is rotatably connected to the second connection shaft 1022; and the first side of the clamping device 102 is opposite to the second side of the clamping device 102. Due to the two supporting arms, when the display device stands on the platform, it is convenient to adjust a watching angle of the expanded screen, so that a user feels more comfortable when watching the expanded screen. Compared with the expanded screen in the prior art, the expanded screen with the supporting frame in this embodiment improves the use experience of the user.

Figure 7:
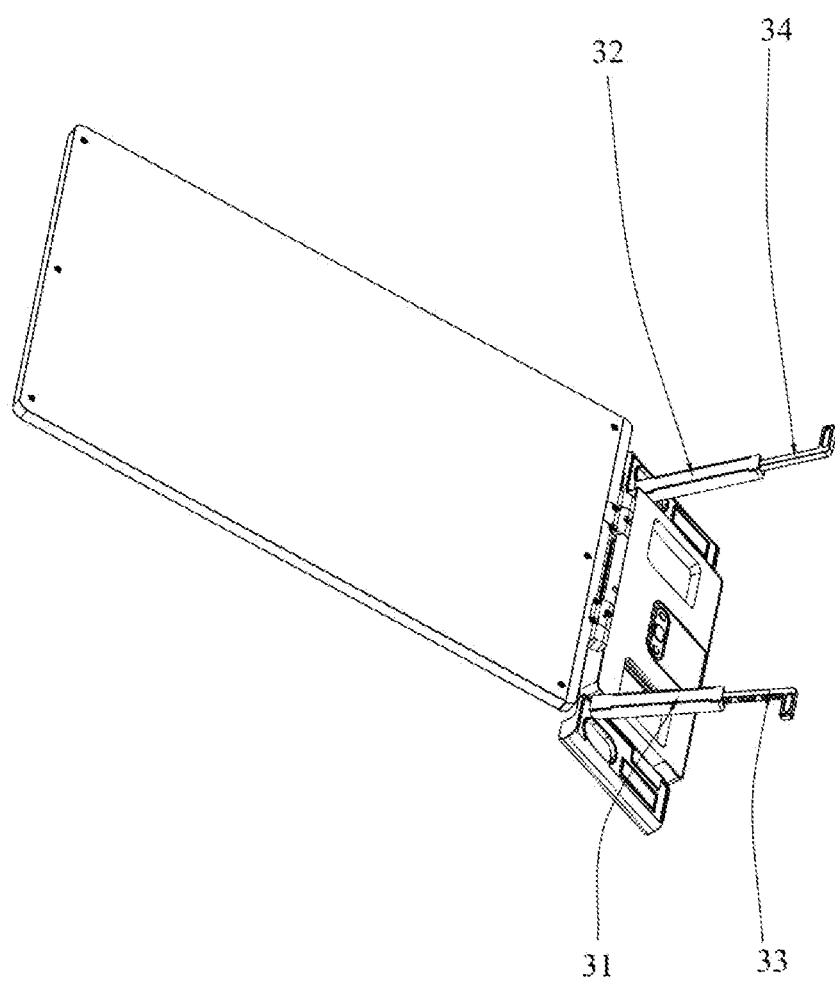
FIG. 7 is a diagram I of an embodiment of a supporting frame according to the present disclosure.
Figure 8:
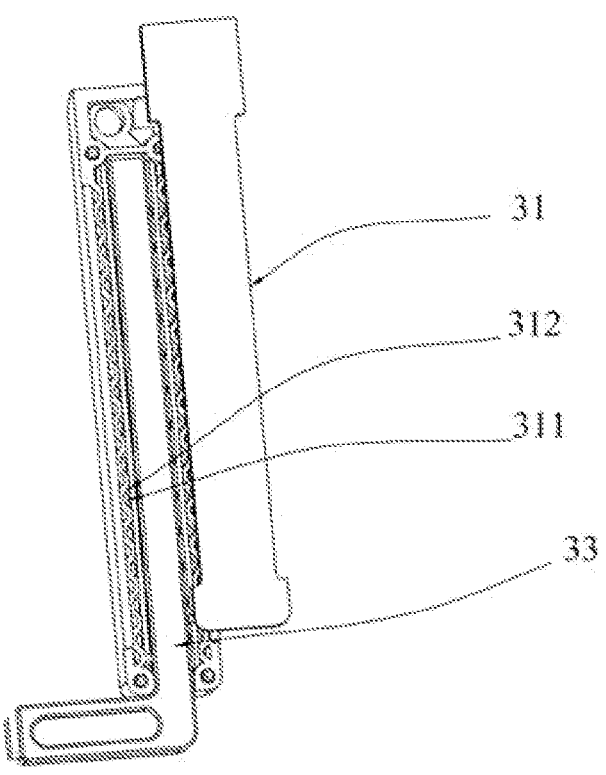
FIG. 8 is a schematic structural diagram of a first supporting arm according to the present disclosure.
Figure 9:
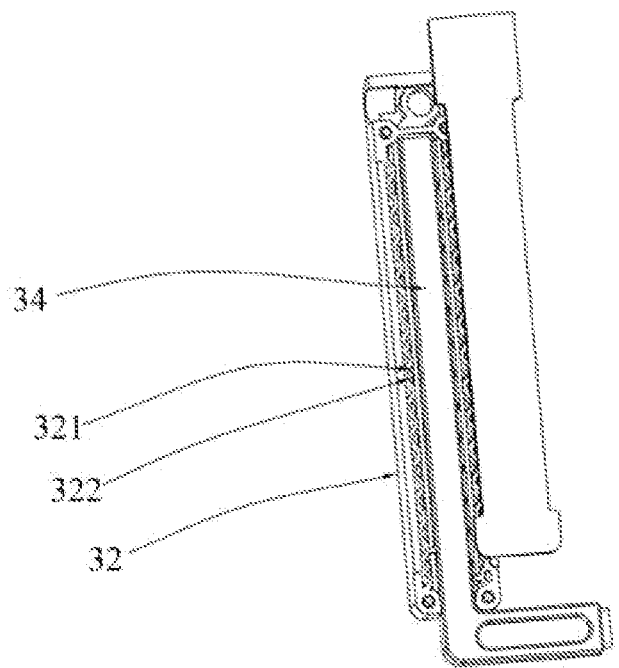
FIG. 9 is a schematic structural diagram of a second supporting arm according to the present disclosure.

Embodiment I of the Supporting Frame, Refer to FIG. 7 to FIG. 9

In this embodiment, the supporting frame 3 further includes a first extension rod 33 and a second extension rod 34; one end of the first extension rod 33 is arranged in the first supporting arm 31, and the other end of the first extension rod 33 extends out of the first supporting arm 31; the first extension rod 33 can be stretched and extend along the first supporting arm 31; one end of the second extension rod 34 is arranged in the second supporting arm 32; the other end of the second extension rod 34 extends out of the second supporting arm 32; and the second extension rod 34 can be stretched and extend along the second supporting arm 32. Due to the arrangement of the extension rods, it is more convenient to adjust the angle of the expanded screen, so that a user feels more comfortable when watching the screen.

In this embodiment, two or more first clamping slots 311 are formed in the first supporting arm 31; the first clamping slots 311 are arranged on two sides of the first extension rod 33; the first clamping slots 311 are internally provided with first balls 312 and wrap the first balls 312; diameters of the first balls 312 are greater than diameters of notches of the first clamping slots 311, so that the first balls 312 are maintained in the first clamping slots 311; one end of each first ball 312 is butted with an inner wall of the notch of the corresponding first clamping slot 311, and the other end of the first ball 312 is butted with a side wall of the first extension rod 33; two or more second clamping slots 321 are formed in the second supporting arm 32; the second clamping slots 321 are arranged on two sides of the second extension rod 34; the second clamping slots 321 are internally provided with second balls 322 and wrap the second balls 322; diameters of the second balls 322 are greater than diameters of notches of the second clamping slots 321, so that the second balls 322 are maintained in the second clamping slots 321; and one end of each second ball 322 is butted with an inner wall of the notch of the corresponding second clamping slot 321, and the other end of the second ball 322 is butted with a side wall of the second extension rod 34. The balls are butted with the extension rods to achieve the displacements of the extension rods and make the extension rods stably and smoothly stretched. The balls and the clamping slots are convenient to arrange. The procedures are simple, and the stability is high.

Preferably, a plurality of first clamping slots 311 and a plurality of first balls 312 are included. It is better if the first clamping slots 311 and first balls 312 on the two sides of the first extension rod 33 are denser, so that the extension rod can be stretched more stably, and the clamping force is higher.

The first supporting arm is provided with a third opening; a first mounting slot is formed in the first supporting arm; one end of the first extension rod is arranged in the first mounting slot; and a third stop portion is arranged at a position, close to the third opening, in the first supporting arm, which is mainly used to prevent disconnection from the first supporting arm when one end of the first extension rod arranged in the first mounting slot is stretched. Similarly, the second supporting arm is provided with a fourth opening; a second mounting slot is formed in the second supporting arm; one end of the second extension rod is arranged in the second mounting slot; and the third stop portion is arranged at the position, close to the opening, in the second supporting arm, which is mainly used to prevent disconnection from the second supporting arm when one end of the second extension rod arranged in the second mounting slot is stretched.

In this embodiment, the first extension rod 33 and the second extension rod 34 are L-shaped. An L-shaped support makes the expanded screen main body have higher stability to prevent the expanded screen main body from toppling over due to a non-uniform force. However, the first extension rod and the second extension rod can also be T-shaped, Y-shaped, or the like.

Figure 10:
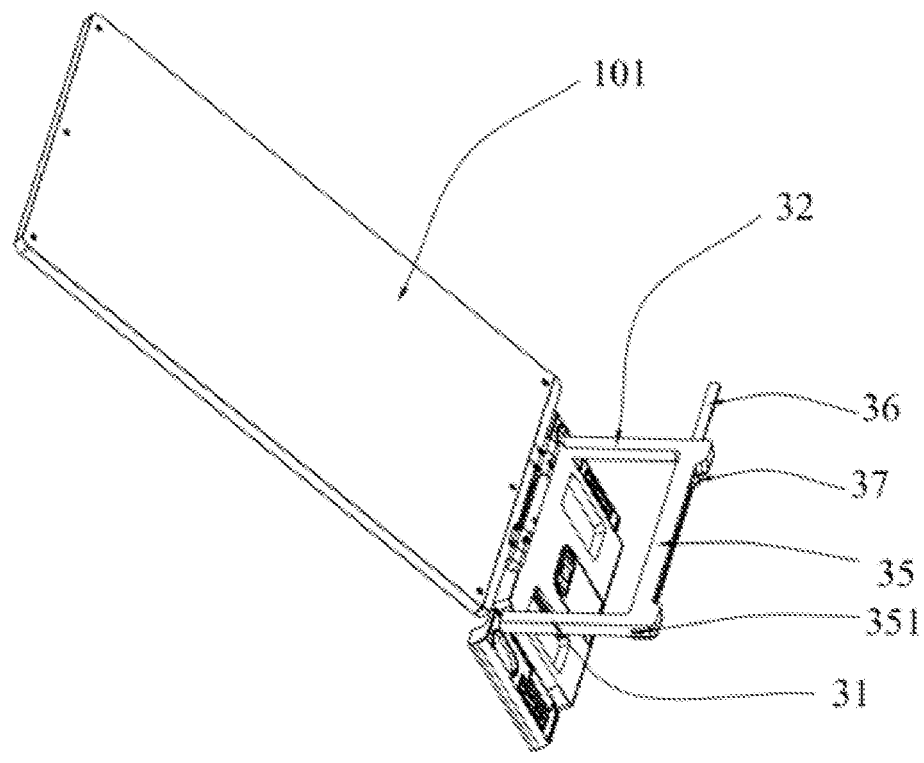
FIG. 10 is a diagram II of an embodiment of a supporting frame according to the present disclosure.
Figure 11:
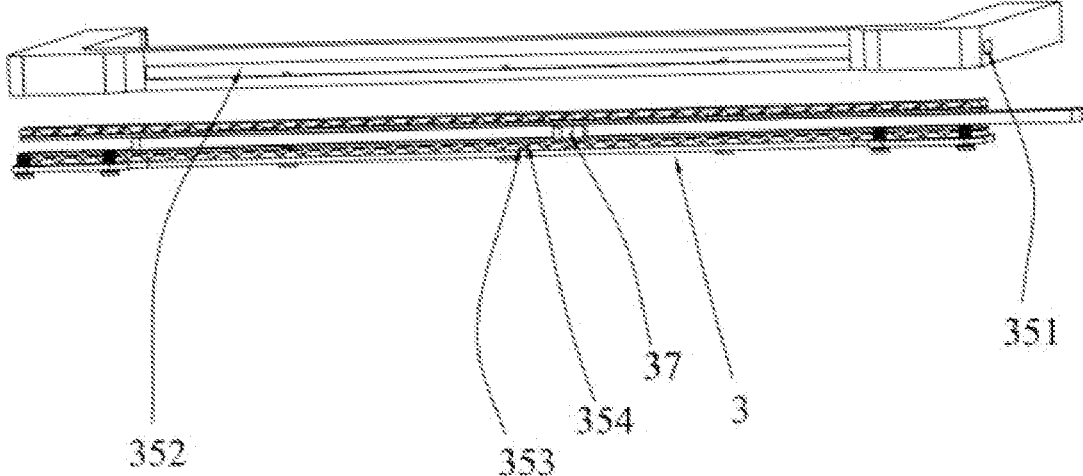
FIG. 11 is a schematic diagram of a diagram II of an embodiment of a supporting frame according to the present disclosure.
Figure 12:
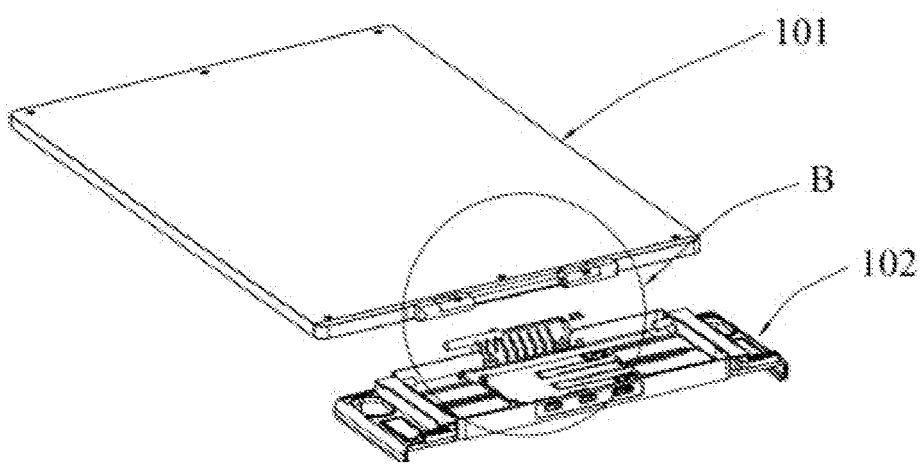
FIG. 12 is a schematic diagram of a connection structure between a display device and a clamping device according to the present disclosure.
Figure 13:
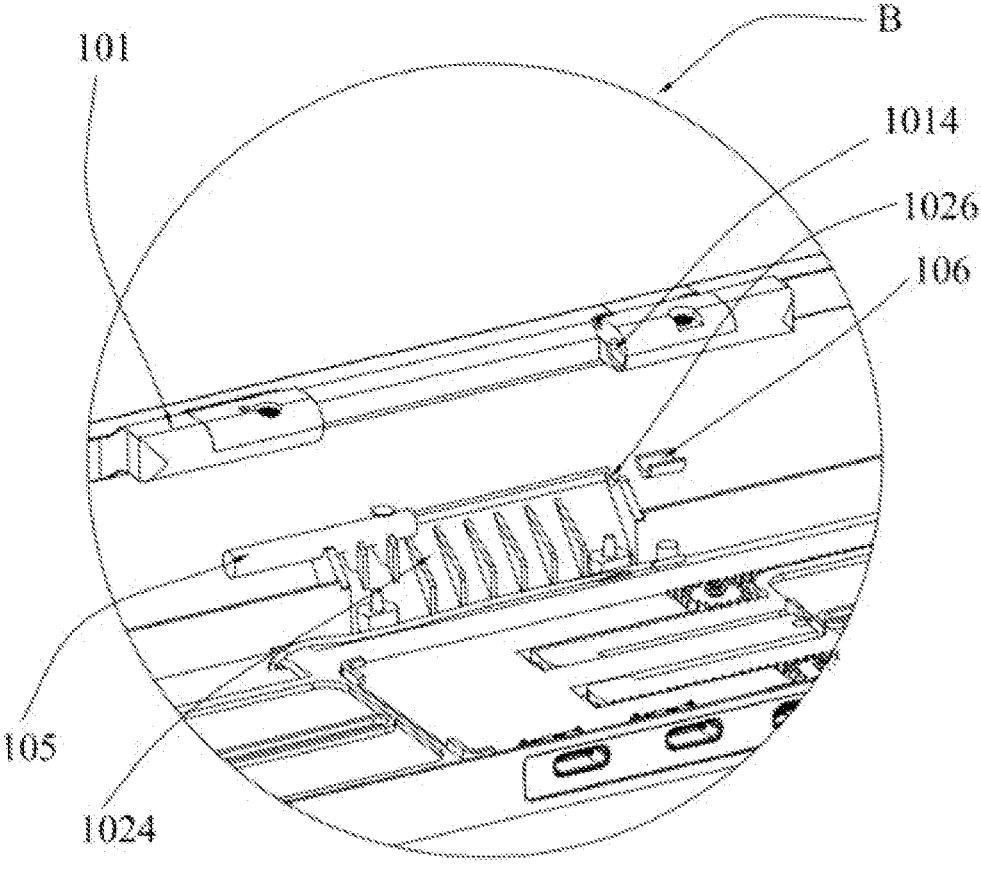
FIG. 13 is an enlarged diagram of B according to the present disclosure.
Figure 14:
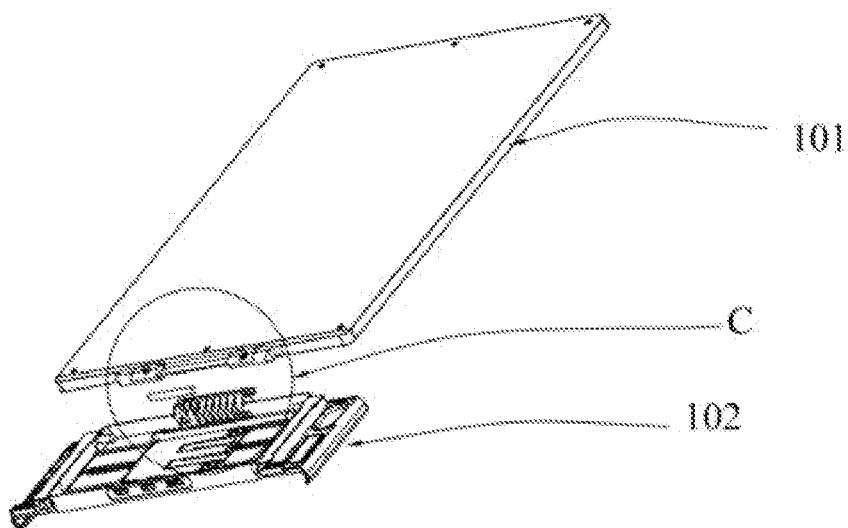
FIG. 14 is a schematic diagram of a connection structure between a display device and a clamping device according to the present disclosure.
Figure 15:
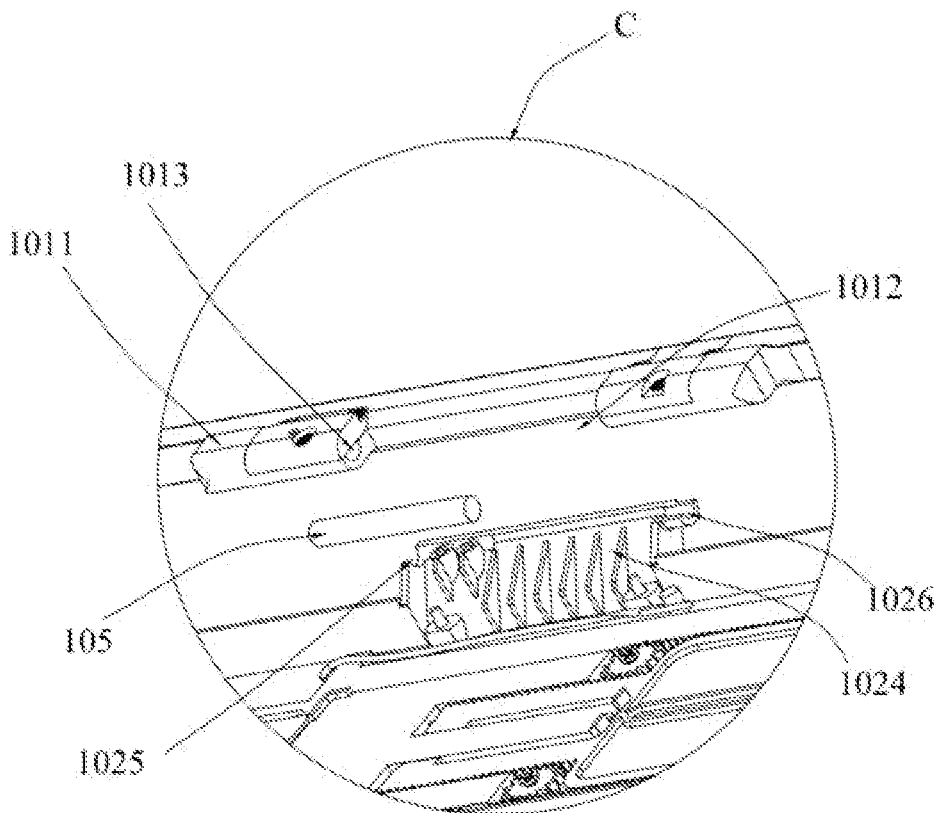
FIG. 15 is an enlarged diagram of C according to the present disclosure.
Figure 16:
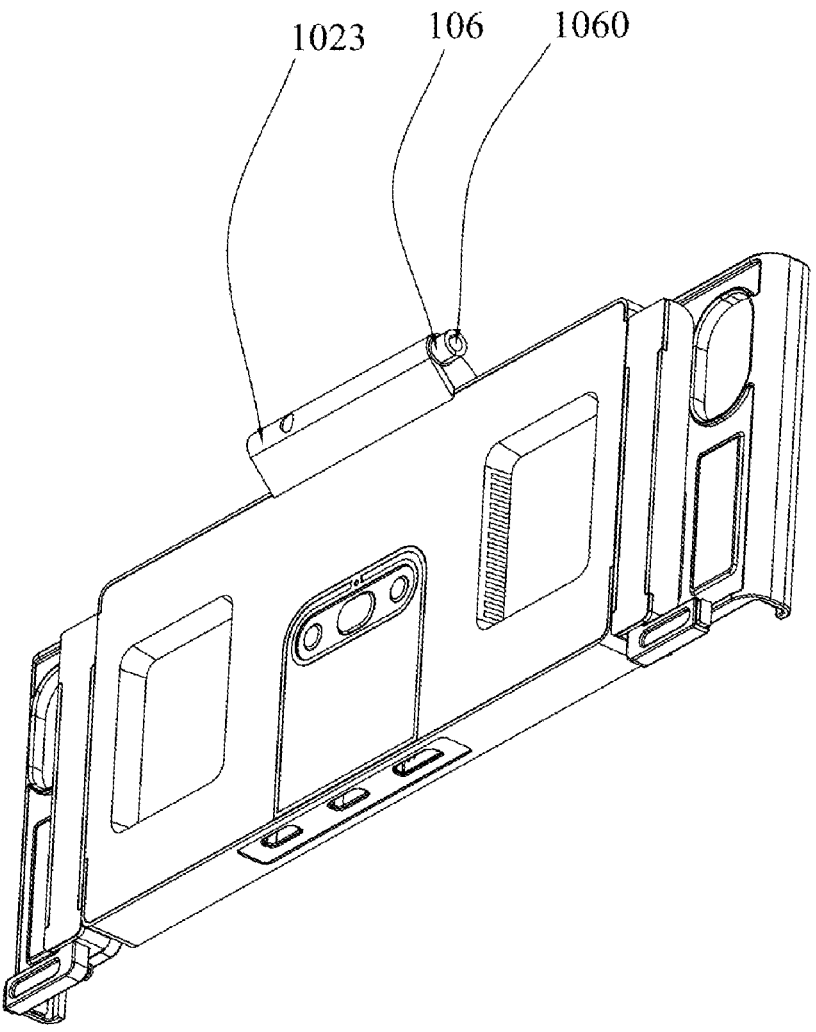
FIG. 16 is a three-dimensional diagram of a clamping device according to the present disclosure.

Embodiment II of the Supporting Frame, Refer to FIG. 10 to FIG. 11

In this embodiment, the supporting frame 3 further includes a third supporting arm 35; one end of the third supporting arm 35 is fixedly connected to the first supporting arm 31, and the other end of the third supporting arm 35 is fixedly connected to the second supporting arm 32; the supporting frame 3 further includes a third extension rod 36 and a sliding member 37 connected to the third extension rod 36; the third extension rod 36 is arranged in the third supporting arm 35; first openings 351 are formed in both a third side surface and a fourth side surface of the third supporting arm 35; when the third extension rod 36 is slid, one end of the third extension rod 36 can be threaded through the first opening 351; a second opening 352 is formed in a first side surface of the third supporting arm 35; the sliding member 37 extends out of the second opening 352; and the sliding member 37 is used for controlling the sliding of the third extension rod 36. The balls are butted with the extension rods to achieve the displacements of the extension rods and make the extension rods stably and smoothly stretched. The balls and the clamping slots are convenient to arrange. The procedures are simple, and the stability is high.

In this embodiment, two or more third clamping slots 353 are formed in the third supporting arm 35; the third clamping slots 353 are arranged on two sides of the third extension rod 36; the third clamping slots 353 are internally provided with third balls 354 and wrap the third balls 354; diameters of the third balls 354 are greater than diameters of notches of the third clamping slots 353, so that the third balls 354 are maintained in the third clamping slots 353; and one end of each third ball 354 is butted with an inner wall of the notch of the corresponding third clamping slot 353, and the other end of the third ball 354 is butted with a side wall of the third extension rod 36. The balls are butted with the extension rods to achieve the displacements of the extension rods and make the extension rods stably and smoothly stretched. The balls and the clamping slots are convenient to arrange. The procedures are simple, and the stability is high.

Figure 2:
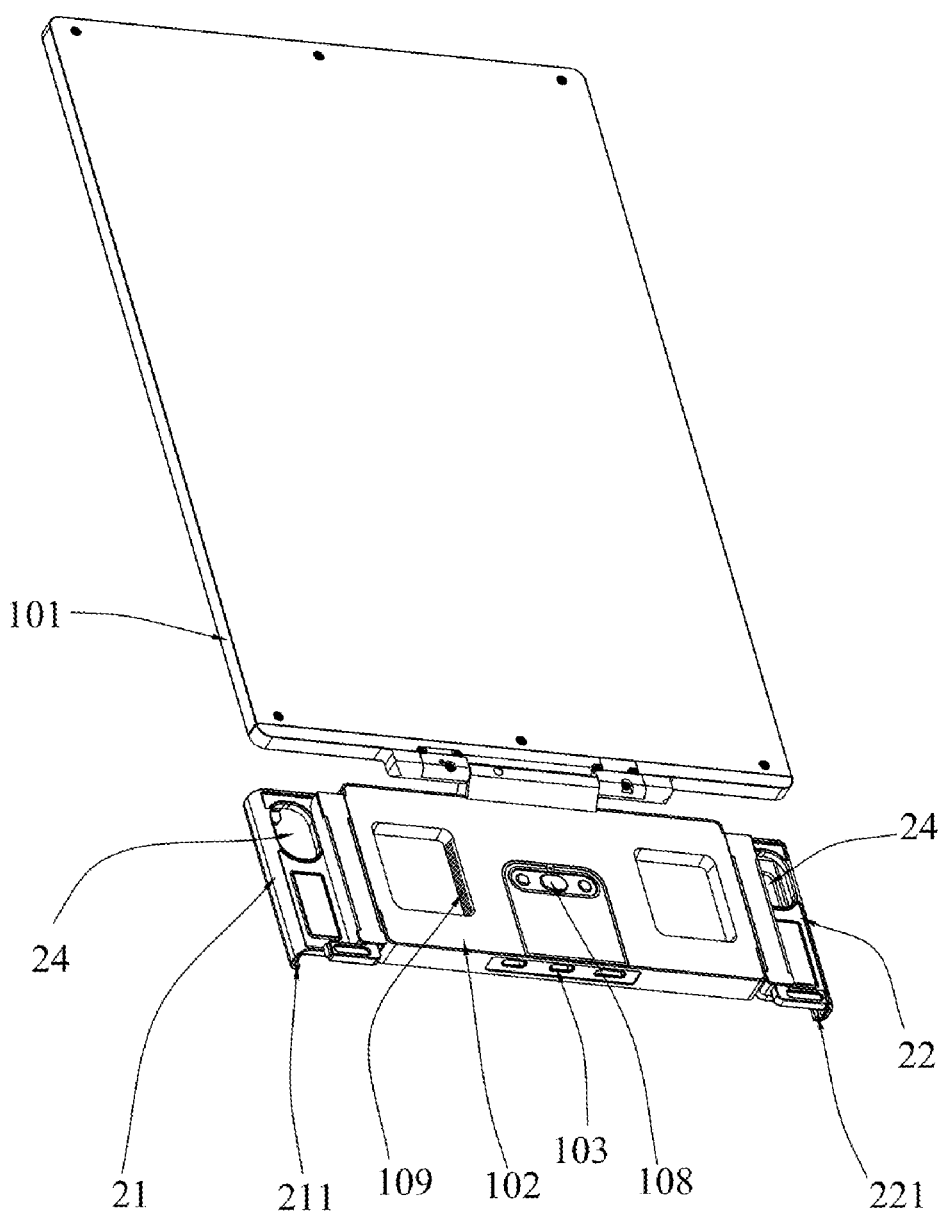
FIG. 2 is a three-dimensional diagram of an expanded screen according to the present disclosure.

In this embodiment, as shown in FIG. 2 to FIG. 3, the expanded screen further includes one or more connection interfaces 103 and a control circuit board 104; the connection interfaces 103 are arranged on a fourth side of the clamping device 102; a fourth side surface of the third supporting arm 35 covers the connection interfaces 103; the control circuit board 104 is arranged in the clamping device 102; and both the connection interfaces 103 and the display device 101 are electrically connected to the control circuit board 104. The connection interfaces and the control circuit board of the existing expanded screen on the market are both arranged on the display device, so that the display device is thicker, appearing heavier and unattractive. The connection interfaces 103 and the control circuit board 104 are now arranged on the clamping device, which reduces arrangement of electronic elements and wires in the display device, so that the display device is designed to be thinner and more beautiful.

In this embodiment, as shown in FIG. 12 to FIG. 16, the expanded screen further includes a third connection shaft 105, a fourth connection shaft 106, and a wire 107; the fourth connection shaft 106 is provided with a through hole 1060; a first connector 1023 is arranged on a third side of the clamping device 102; a wire passing channel 1024 is arranged in the first connector 1023; the wire passing channel 1024 is communicated to an interior of the clamping device 102; the first connector 1023 is provided with a first mounting hole 1025 and a first threading hole 1026 on both sides; the first threading hole 1026 is communicated to the wire passing channel 1024; a second connector 1011 is arranged at one end of the display device 101; a notch 1012 is formed in the middle of the second connector 1011; the notch 1012 is provided with a second mounting hole 1013 and a second threading hole 1014 on both sides; the second threading hole 1014 is communicated to an interior of the second connector 1011; the second connector 1011 is communicated to an interior of the display device 101; an connection end of the first connector 1023 is mounted at the notch 1012; a gap 5 exists between the connection end of the first connector 1023 and a first side wall of the second connector 1011 opposite the notch 1012; one end of the third connection shaft 105 is fixedly plugged into the first mounting hole 1025, and the other end of the third connection shaft 105 is movably plugged into the second mounting hole 1013; one end of the fourth connection shaft 106 is fixedly connected to the clamping device 102; the through hole 1060 of the fourth connection shaft 106 is communicated to the first threading hole 1026; the other end of the fourth connection shaft 106 is movably plugged into the second threading hole 1014, and the through hole 1060 of the fourth connection shaft 106 is communicated to the second threading hole 1014; and one end of the wire 107 is connected to the control circuit board 104, and the other end of the wire 107 is electrically connected to the display device 101 through the wire passing channel 1024, the first threading hole 1026, the through hole 1060, the second threading hole 1014, and the second connector 1011 in sequence. The gap 5 between the connection end of the connection end of the first connector 1023 and the first side wall of the second connector 1011 opposite the notch 1012 is mainly prevent a relatively small rotation angle between the display device and the clamping device. By the arrangement of the gap 5, a large rotation angle can be achieved between the display device and the clamping device. A back surface of the display device and a back surface of the clamping device can abut against each other, so that a front surface of the display device and a front surface of the clamping device can also abut against each other. It is noted that the front surface of the display device and the front surface of the clamping device can be set to not abut against each other to prevent the clamping device from scratching a display screen of the display device. To facilitate demolding, reduce procedures, and achieve high stationarity, the fourth connection shaft and the first connector 1023, and the first connector 1023 and the clamping device are integrally formed.

Figure 19:
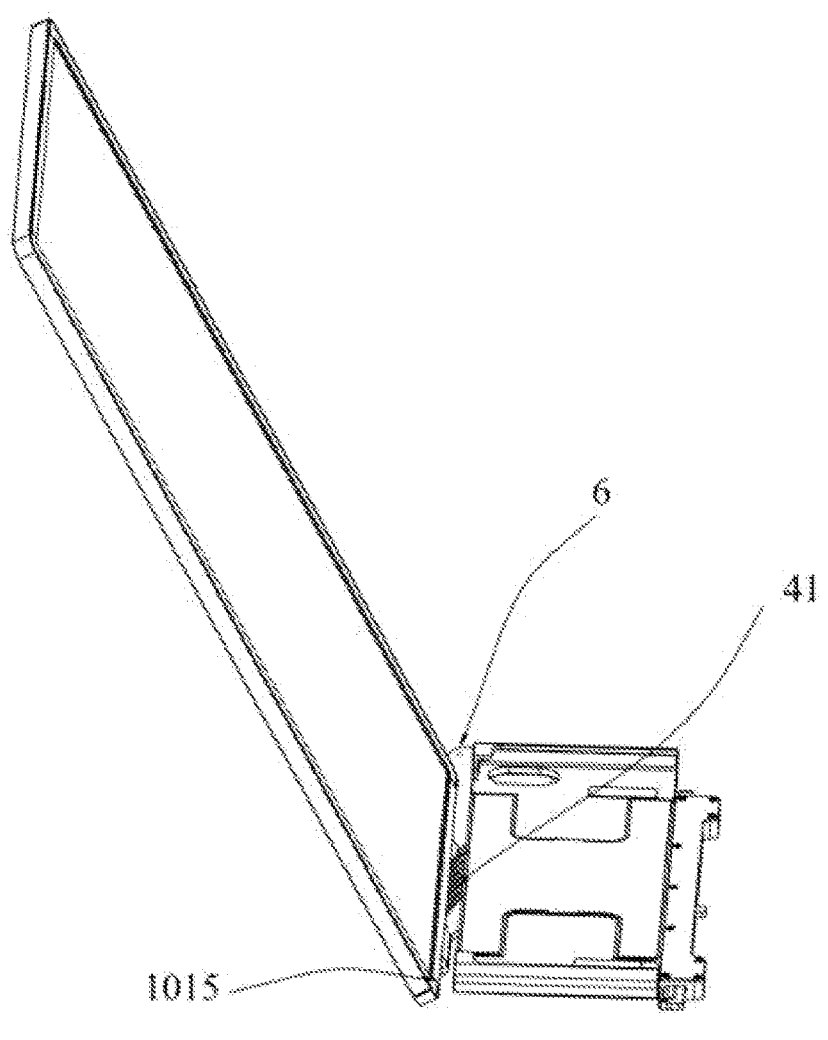
FIG. 19 is a schematic collapsible diagram of an expanded screen according to the present disclosure.
Figure 20:
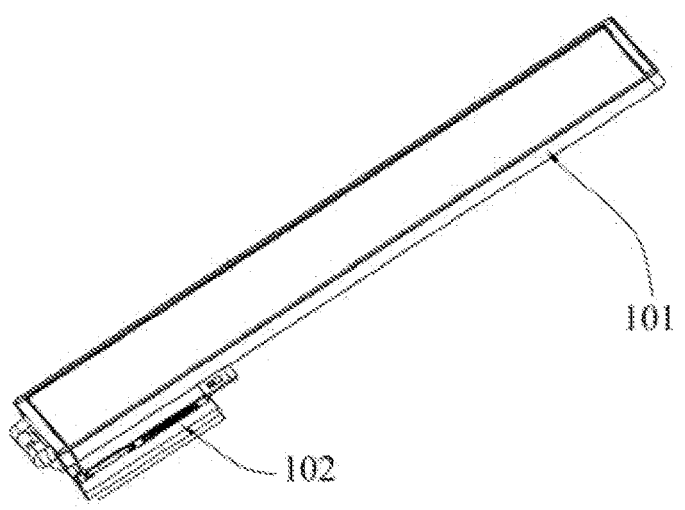
FIG. 20 is a schematic collapsible diagram of an expanded screen according to the present disclosure.

In this embodiment, a third stop portion 41 is arranged on the first connector 1023; when the display device 101 is rotated towards the front surface of the clamping device 102, the third stop portion 41 stops the front surface of the display device 101 from abutting against the front surface of the clamping device 102; and when the display device 101 is rotated towards the back surface of the clamping device 102, the back surface of the display device 101 can abut against the back surface of the clamping device 102. As shown in FIG. 19, preferably, the front surface of the display device and the front surface of the clamping device do not abut against each other. The stop portion stops the display device from abutting against the clamping device, thereby preventing the clamping device from scratching the display screen of the display device. As shown in FIG. 20, the back surface of the display device 101 and the back surface of the clamping device 102 can abut against each other, which reduces the length and saves the usage space, and it is convenient for a user to carry the expanded screen.

Figure 17:
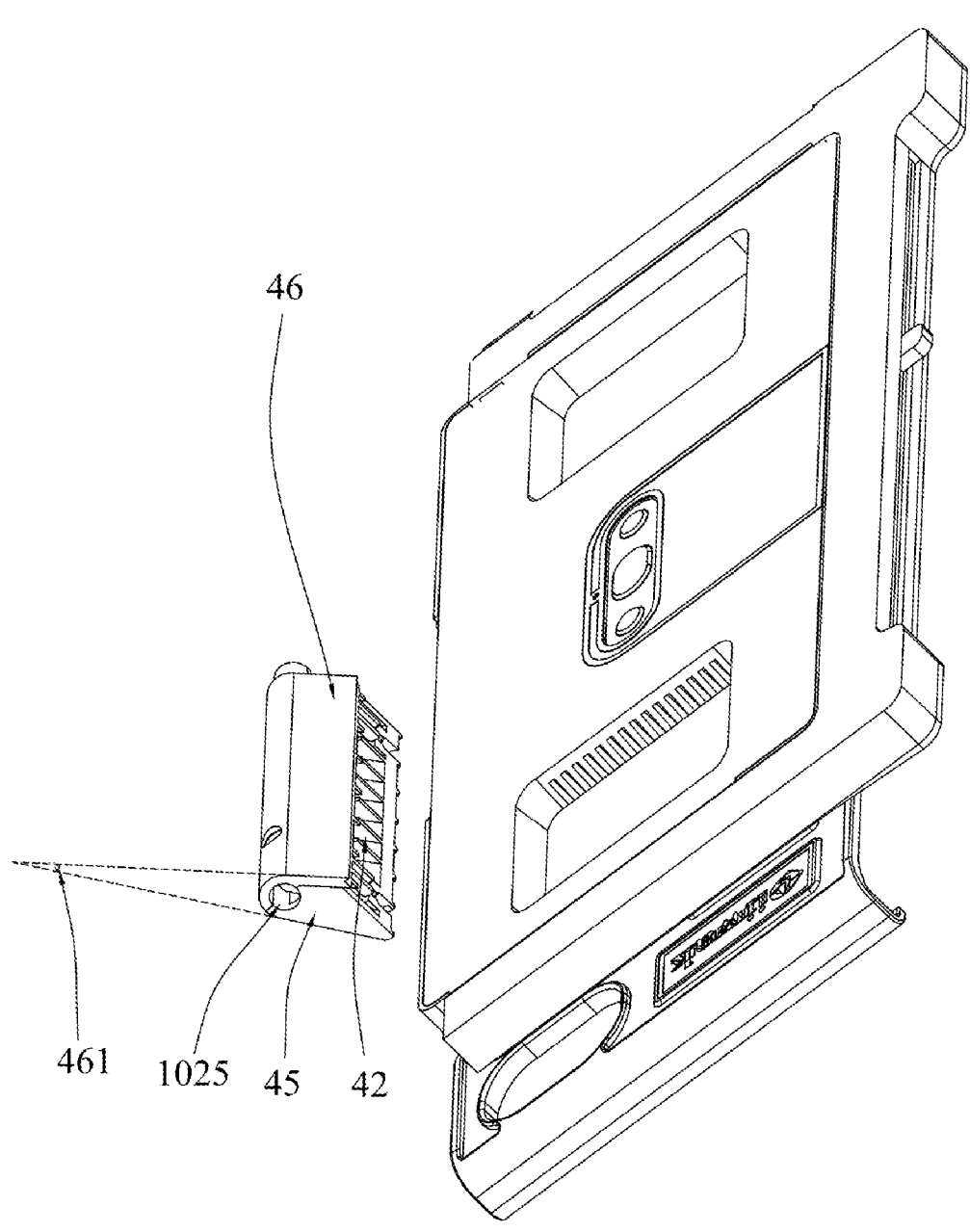
FIG. 17 is a schematic exploded diagram of a connection structure between a clamping device and a first connector according to the present disclosure.
Figure 18:
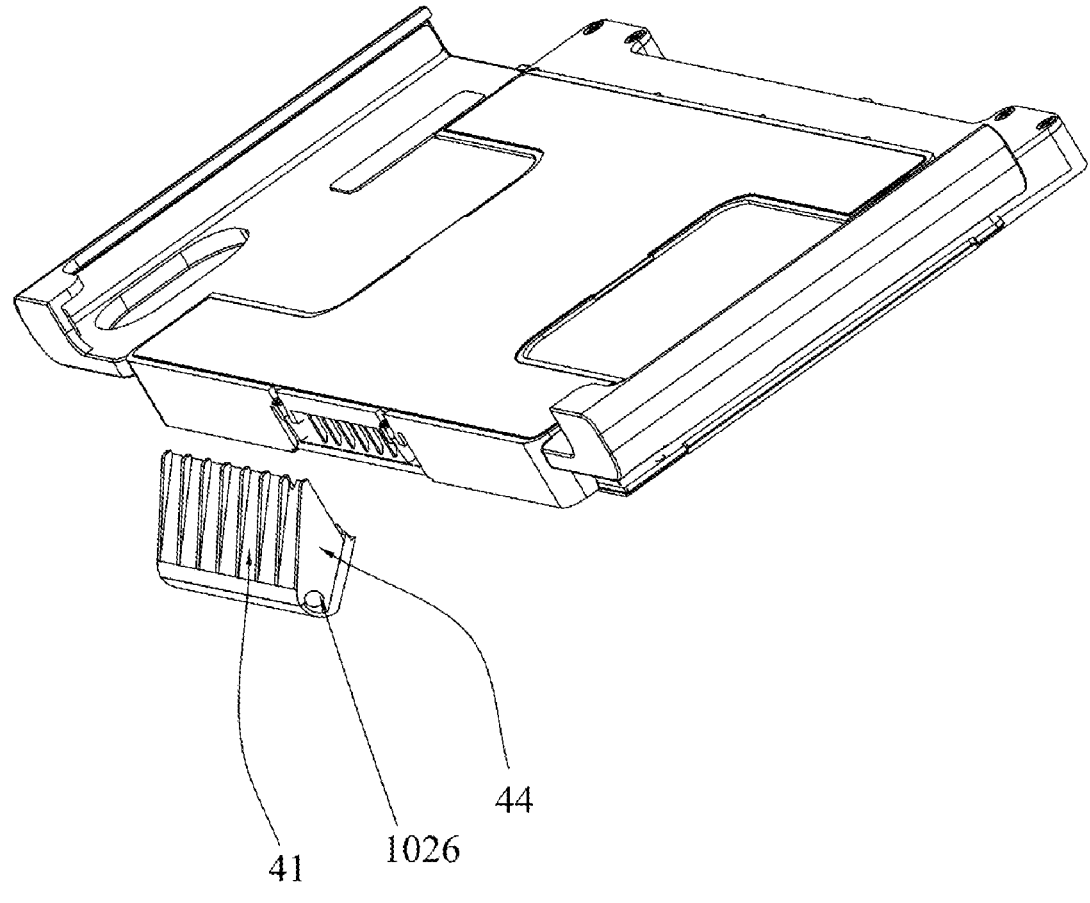
FIG. 18 is a schematic exploded diagram of a connection structure between a clamping device and a first connector according to the present disclosure.

In this embodiment, as shown in FIG. 17 to FIG. 18, the first connector 1023 includes a first connection surface 42, a second connection surface, a third connection surface 44, a fourth connection surface 45, and a fifth connection surface 46; the first connection surface 42, the second connection surface, and the fifth connection surface 46 are connected end to end; the third connection surface 44, the fourth connection surface 45, and the fifth connection surface 46 are arranged on two sides of the first connection surface 42 and the second connection surface and are connected to the third connection surface 44, the fourth connection surface 45, and the fifth connection surface 46; the first connection surface 42 and the fifth connection surface 46 are connected to form an inner corner $\beta$ 461; and the inner corner $\beta$ 461 is an acute angle. The third stop portion 41 is the second connection surface; the clamping device 102 is fixedly connected to the first connection surface 42; the first threading hole 1026 is formed in the third connection surface 44 and is close to the inner corner $\beta$ 461; the first mounting hole 1025 is formed in the fourth connection surface 45 and is close to the inner corner $\beta$ 461; when the display device 101 is rotated towards the front surface of the clamping device 102, a first side edge 1015 of the display device 101 is butted with the second connection surface, and the front surface of the display device 101 forms an angle $\alpha$ 6 with the front surface of the clamping r, device 102; and when the display device 101 is rotated towards the back surface of the clamping device 102, the back surface of the display device 101 abuts against the back surface of the clamping device 102.

Joints of the second connection surface and the fifth connection surface mentioned above are in an arc shape, making the expanded screen look more beautiful. As the joints of the second connection surface and the fifth connection surface mentioned above are in the arc shape, in order to make the inner corners R 461 displayed more clearly, the dashed extension lines in FIG. 17 represent the inner corner $\beta$ 461 formed by the first connection surface 42 and the fifth connection surface 46.

The above expanded screen can also include a control button 108 and a heat dissipation hole 109. The control button 108 and the heat dissipation hole 109 are arranged on the back of the clamping device 102. The control button 108 is electrically connected to the control circuit board 104. The control button 108 is used to control the display device 101. There can be three control buttons 108, including a switch of the display screen of the display device, and a volume up button and a volume down button which can control the display device, but it is not limited to three buttons.

In this embodiment, handles 24 are arranged at a second end of the first clamping member 21 and a second end of the second clamping member 22. The handles 24 are more convenient for stretching the first clamping member 21 and the second clamping member 22.

The foregoing description is merely illustrative of the preferred embodiments of the present disclosure and is not intended to limit the present disclosure, but it is intended that any modifications, equivalents, substitutions, and modifications made within the spirit and principles of the present disclosure be embraced within the scope of the present disclosure.

What is claimed is:

1. An expanded screen, wherein the expanded screen is detachably mounted on a display; the expanded screen comprises an expanded screen main body, a first clamping member, a second clamping member, and a connection component; the connection component, the first clamping member, and the second clamping member are all arranged on the expanded screen main body; a first end of the first clamping member is provided with a first clamping portion; a first end of the second clamping member is provided with a second clamping portion; the first clamping portion and the second clamping portion are clamped on the display; a second end of the first clamping member is slidably connected to a second end of the second clamping member through the connection component; and the first clamping member and the second clamping member slide relative to each other, so that a distance between the first clamping member and the second clamping member is relatively extended or shortened;

wherein the connection component comprises a gear and a locking component; both the gear and the locking component are arranged on the expanded screen main body; the first clamping component comprises a first connection end and a first clamping end; the first clamping portion is arranged at a first end of the first clamping end, and a second end of the first connection end is fixedly connected to one end of the first clamping end; the second clamping member comprises a second connection end and a second clamping end; the second clamping portion is arranged at a first end of the second clamping end, and a second end of the second connection end is fixedly connected to one end of the second clamping end; the first connection end and the second connection end are both provided with sawteeth; the sawteeth are clamped with sawteeth of the gear; the first connection end slides relative to the second connection end through the connection component; a clamping space is formed between the first clamping portion and the second clamping portion; and the locking component is used for fixing the clamping space.

2. The expanded screen according to claim 1, wherein the locking component comprises an elastic member and a positioning column; the positioning column is fixedly connected to the expanded screen main body; a first end of the elastic member is connected to the positioning column, and a second end of the elastic member is connected to the first clamping member or the second clamping member; when the first clamping member and the second clamping member slide away from each other; and the elastic member enables the first clamping member and the second clamping member to be inwards tightened.

3. The expanded screen according to claim 2, wherein the gear comprises a first gear and a second gear; the first connection end comprises a first rack A and a first rack B; the second connection end comprises a second rack A and a second rack B; the first rack A and the second rack A are both connected to the first gear; the sawteeth of the first rack A and the sawteeth of the second rack A are both clamped with the sawteeth of the first gear; the first rack A and the second rack A slide relative to the first gear; the first rack B and the second rack B are both connected to the second gear; the sawteeth of the first rack B and the sawteeth of the second rack B are both clamped with the sawteeth of the second gear; the first rack B and the second rack B slide relative to the second gear; and when the first clamping member slides away from the second clamping member, the first clamping member drives the second clamping member to slide through the first gear and the second gear.

4. The expanded screen according to claim 3, wherein a first guide rail A, a first guide rail B, a second guide rail A, and a second guide rail B are arranged in the expanded screen main body; the first guide rail A is arranged on a bottom of the first rack A; the first rack A is clamped to the first guide rail A; the first rack A slides along the first guide rail A; the first guide rail B is arranged on a bottom of the first rack B; the first rack B is clamped to the first guide rail B; the first rack B slides along the first guide rail B; the second guide rail A is arranged on a bottom of the second rack A; the second rack A is clamped to the second guide rail A; the second rack A slides along the second guide rail A; the second guide rail B is arranged on a bottom of the second rack B; the second rack B is clamped to the second guide rail B; and the second rack B slides along the second guide rail B.

5. The expanded screen according to claim 3, wherein the first rack A is provided with a first clamping portion A; the first rack B is provided with a first clamping portion B; a first stop portion A and a first stop portion B are further arranged in the expanded screen main body; the first stop portion A and the first stop portion B are arranged between the first rack A and the first rack B; and when the first clamping member is stretched away from the expanded screen main body, the first stop portion A is clamped to the first clamping portion A, and the first stop portion B is clamped to the first clamping portion B, so as to maintain connection between the first rack A and the first gear and connection between the first rack B and the second gear.

6. The expanded screen according to claim 5, wherein the first clamping member is further provided with a first clamping portion C and a first clamping portion D; and when the first clamping member is tightened towards the expanded screen main body, the first stop portion A is clamped to the first clamping portion C, and the first stop portion B is clamped to the first clamping portion D, so as to maintain connection between the first rack A and the first gear and connection between the first rack B and the second gear.

7. The expanded screen according to claim 3, wherein a second clamping portion A is arranged on an outer side of the second rack A, and a second clamping portion B is arranged on an outer side of the second rack B; and when the second clamping member is stretched away from the expanded screen main body, an inner wall of the expanded screen main body is clamped to the second clamping portion A and the second clamping portion B to maintain connection between the second rack A and the first gear and the connection between the second rack B and the second gear.

8. The expanded screen according to claim 7, wherein the second clamping member is further provided with a second clamping portion C and a second clamping portion D; a second stop portion A and a second stop portion B are further arranged in the expanded screen main body; the second stop portion A and the second stop portion B are arranged between the second rack A and the second rack B; and when the second clamping member is tightened towards the expanded screen main body, the second stop portion A is clamped to the second clamping portion C, and the second stop portion B is clamped to the second clamping portion D, so as to maintain connection between the first rack A and the first gear and connection between the first rack B and the second gear.

9. An expanded screen, wherein the expanded screen is detachably mounted on a display; the expanded screen comprises an expanded screen main body, a first clamping member, a second clamping member, and a connection component; the connection component, the first clamping member, and the second clamping member are all arranged on the expanded screen main body; a first end of the first clamping member is provided with a first clamping portion; a first end of the second clamping member is provided with a second clamping portion; the first clamping portion and the second clamping portion are clamped on the display; a second end of the first clamping member is slidably connected to a second end of the second clamping member through the connection component; and the first clamping member and the second clamping member slide relative to each other, so that a distance between the first clamping member and the second clamping member is relatively extended or shortened;

wherein the expanded screen further comprises a supporting frame; the supporting frame is arranged on a back surface of the expanded screen main body; the supporting frame is rotatably connected to the expanded screen main body; and when the expanded screen is placed on a platform, the supporting frame supports the expanded screen main body.

10. The expanded screen according to claim 9, wherein the expanded screen main body comprises a display device and a clamping device; the clamping device is rotatably connected to the display device; and the first clamping member, the second clamping member, the connection component, and the supporting frame are all arranged on the clamping device.

11. The expanded screen according to claim 10, wherein the supporting frame comprises a first supporting arm and a second supporting arm; the first supporting arm is arranged on a first side of the clamping device; the first side of the clamping device is fixedly provided with a first connection shaft; the first supporting arm is rotatably connected to the first connection shaft; the second supporting arm is arranged on a second side of the clamping device; a second connection shaft is fixedly arranged on the second side of the clamping device; the second supporting arm is rotatably connected to the second connection shaft; and the first side of the clamping device is opposite to the second side of the clamping device.

12. The expanded screen according to claim 11, wherein the supporting frame further comprises a first extension rod and a second extension rod; a first end of the first extension rod is arranged in the first supporting arm, and a second end of the first extension rod extends out of the first supporting arm; the first extension rod is stretched and extends along the first supporting arm; a first end of the second extension rod is arranged in the second supporting arm; a second end of the second extension rod extends out of the second supporting arm; and the second extension rod is stretched and extends along the second supporting arm.

13. The expanded screen according to claim 12, wherein two or more first clamping slots are formed in the first supporting arm; the first clamping slots are arranged on two sides of the first extension rod; the first clamping slots are internally provided with first balls and wrap the first balls; diameters of the first balls are greater than diameters of notches of the first clamping slots, so that the first balls are maintained in the first clamping slots; a first end of each first ball is butted with an inner wall of the notch of the corresponding first clamping slot, and a second end of the first ball is butted with a side wall of the first extension rod; two or more second clamping slots are formed in the second supporting arm; the second clamping slots are arranged on two sides of the second extension rod; the second clamping slots are internally provided with second balls and wrap the second balls; diameters of the second balls are greater than diameters of notches of the second clamping slots, so that the second balls are maintained in the second clamping slots; and a first end of each second ball is butted with an inner wall of the notch of the corresponding second clamping slot, and a second end of the second ball is butted with a side wall of the second extension rod.

14. The expanded screen according to claim 10, wherein the supporting frame further comprises a third supporting arm; a first end of the third supporting arm is fixedly connected to the first supporting arm, and a second end of the third supporting arm is fixedly connected to the second supporting arm; the supporting frame further comprises a third extension rod and a sliding member connected to the third extension rod; the third extension rod is arranged in the third supporting arm; first openings are formed in both a third side surface and a fourth side surface of the third supporting arm; when the third extension rod is slid, one end of the third extension rod is threaded through the first opening; a second opening is formed in a first side surface of the third supporting arm; the sliding member extends out of the second opening; and the sliding member is used for controlling the sliding of the third extension rod.

15. The expanded screen according to claim 14, wherein the expanded screen further comprises one or more connection interfaces and a control circuit board; the connection interfaces are arranged on a fourth side of the clamping device; a fourth side surface of the third supporting arm covers the connection interfaces; the control circuit board is arranged in the clamping device; and both the connection interfaces and the display device are electrically connected to the control circuit board.

* * * * *